United States Patent [19]
Kataoka

[11] Patent Number: 5,155,418
[45] Date of Patent: Oct. 13, 1992

[54] ACTUATOR DEVICE

[75] Inventor: Kenichi Kataoka, Yokohama, Japan

[73] Assignee: Canon Kabushiki Kaisha, Tokyo, Japan

[21] Appl. No.: 794,834

[22] Filed: Nov. 21, 1991

Related U.S. Application Data

[63] Continuation of Ser. No. 598,422, Oct. 16, 1990, abandoned.

[30] Foreign Application Priority Data

Oct. 16, 1989 [JP] Japan ................. 1-268717

[51] Int. Cl.$^5$ .................................. H01L 41/08
[52] U.S. Cl. .................. 318/116; 310/316; 310/323
[58] Field of Search .............. 318/116–118; 310/316, 317, 319, 323, 328

[56] References Cited
U.S. PATENT DOCUMENTS

| | | | |
|---|---|---|---|
| 4,240,141 | 12/1980 | Vasiliev et al. | 310/316 X |
| 4,580,073 | 4/1986 | Okumura et al. | 310/323 |
| 4,794,294 | 12/1988 | Shimizu et al. | 310/316 |
| 4,914,336 | 4/1990 | Yamasaki | 310/316 |
| 5,001,404 | 3/1991 | Kataoka | 318/116 |
| 5,004,964 | 4/1991 | Kataoka et al. | 318/128 |

*Primary Examiner*—Mark O. Budd
*Attorney, Agent, or Firm*—Fitzpatrick, Cella, Harper & Scinto

[57] ABSTRACT

An actuator device has a plurality of projections formed in a vibrator, with the projections being in pressure contact with a friction surface of a contact member, and relative movement between the vibrator and the projections is performed by generating vibrations in the vibrator. The actuator device prevents the contact member and the projections from stopping at identical positions in pressure contact with one another at every stop operation of driving by the actuator device to produce projection marks on the friction member, causing wow/flutter and decreasing torque performance.

9 Claims, 9 Drawing Sheets

FIG. 9(a)
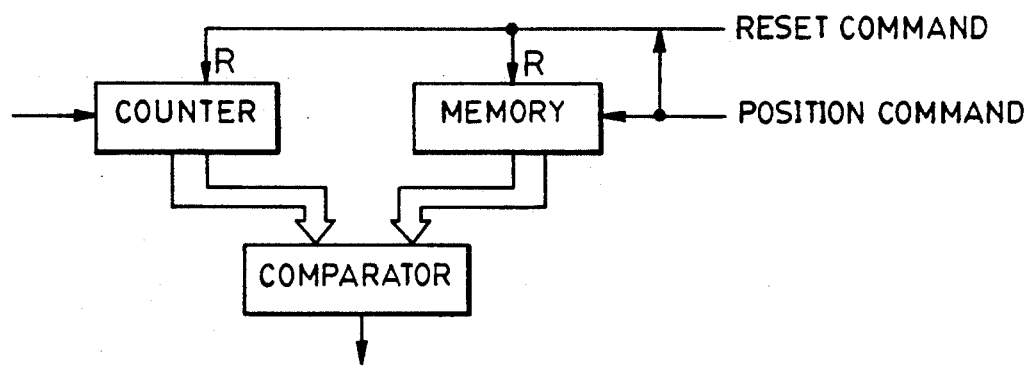
FIG. 9(b)
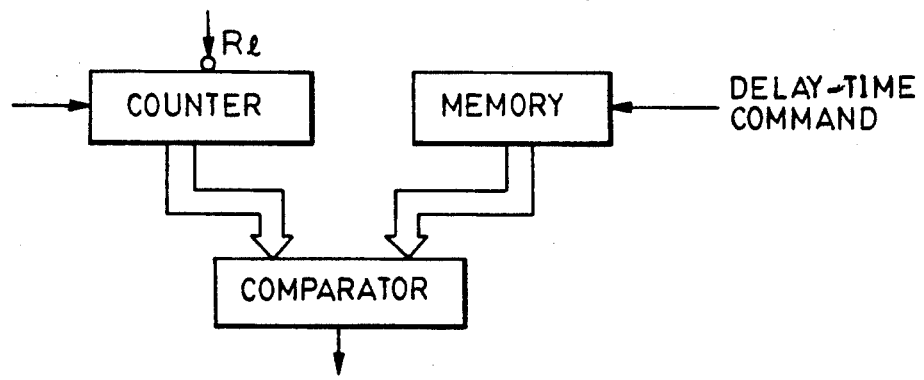
FIG. 10
| COMMAND NUMBER | DATA |
|---|---|
| 1 | $N_1$ |
| 2 | $N_2$ |
| 3 | $N_3$ |
| ⋮ | $N_4$ |
| ⋮ | ⋮ |
| N | $N_N$ |

ACTUATOR DEVICE

This application is a continuation of application Ser. No. 07/598,422 filed Oct. 16, 1990, now abandoned.

BACKGROUND OF THE INVENTION

1. Field of the Invention

This invention relates to an ultrasonic actuator, such as an ultrasonic motor or the like, having a structure wherein slits are provided on a traveling-wave-forming surface of an elastic member in which a traveling wave is formed.

2. Description of the Related Art

In an ultrasonic motor, a traveling wave is formed in an elastic member made of metal. The elastic member is formed, for example, in the shape of a circle or an ellipse by a piezoelectric element or the like. A surface opposite to the surface on which the piezoelectric element is fixed is in pressure contact with a relative-movement member, and the elastic member and the relative-movement member are driven due to friction by the traveling wave to provide relative movement. Since the amplitude of the traveling wave formed in the elastic member is small, it is arranged in most cases to lower the neutral axis of vibration, for example, for the purpose of increasing torque by providing a number of projections divided by slits on a traveling-wave-forming surface of the elastic member in the circumferential direction.

Such an ultrasonic motor can be applied to various uses. It has been proposed, for example, to use the motor as a driving source for performing reciprocating drive of a print head of a printer.

In such an ultransonic motor, a friction surface is usually fixed on a surface contacting the elastic member of the relative-movement member.

One example of a vibration wave motor is shown in U.S. Pat. No. 4,580,073, which discloses a vibration member having a plurality of projections and being driven by an electro-mechanical conversion element. The projections drive a movable member by receiving travelling vibration waves generated by the conversion element.

When such an ultrasonic motor is used, for example, as a driving source for driving a print head of a printer as described above, the reciprocating stroke for the print head is constant and the print head is moved at a constant pitch. Thus, it happens that the positional relationship between projections formed between slits in the elastic member and the friction surface become identical at the start and stop of the ultrasonic motor. If cases of slight deviations in the positional relationship are included, the possibility of the projections and the friction member stopping in nearly identical positional relationship is high.

Hence, there is the problem that indentations due to the projections on the elastic member are produced at identical positions in the friction member, causing wow/flutter and reducing torque perfomance.

When the ultrasonic motor is used as a driving source for driving a print head as discussed above, additional elements are used to effect movement of the print head. For example, rotation of the rotor, or relative-movement member, is transmitted to a belt through a transmission. The belt is connected to the print head and can move the print head back and forth. In addition, a rotary encoder can be used to monitor movement of the print head.

SUMMARY OF THE INVENTION

It is an object of the present invention to solve the above-described problem.

It is another object of the prevent invention to provide an ultrasonic actuator capable of performing drive with stable performance by preventing partial abrasion of a friction member.

These and other objects are accomplished, according to one aspect of the present invention, by an ultrasonic actuator for regulating a pressure-contact member in pressure contact with a surface of an elastic member (a vibrator) having a plurality of projections with pressure via a friction member. Vibrations are generated in the elastic member, and the elastic member and the pressure-contact member are relatively moved by the vibration formed in the elastic member. The relative positional relationship between the projections and the friction surface when the actuator is started, stopped, or rotated in the forward or reverse direction is randomly changed.

According to another aspect, the present invention relates to an actuator device in which vibration in an elastic member is stopped when the amount of relative movement between the elastic member and a contact-pressure member has moved further by a predetermined amount after moving by a previously determined amount, and the amount of the further movement is changed for every operation to stop the vibration of the elastic member.

According to another aspect, the present invention relates to an actuator device in which the above-described relative movement is repeated for every integer multiple of a unit amount of movement, and the interval between the above-described projections or the unit amount of movement is set so that the interval between the slits does not become an integer multiple of the unit amount of movement.

These and other objects of the present invention will become more apparent from the description of the preferred embodiments made in reference to the accompanying drawings.

BRIEF DESCRIPTION OF THE DRAWINGS

FIGS. 9(a) and 9(b) are circuit diagrams showing embodiments of comparator 8 and delay circuit 9 shown in FIG. 1, respectively; and FIG. 10 is a table showing data of delay time.

DESCRIPTION OF THE PREFERRED EMBODIMENTS

Figure 1:
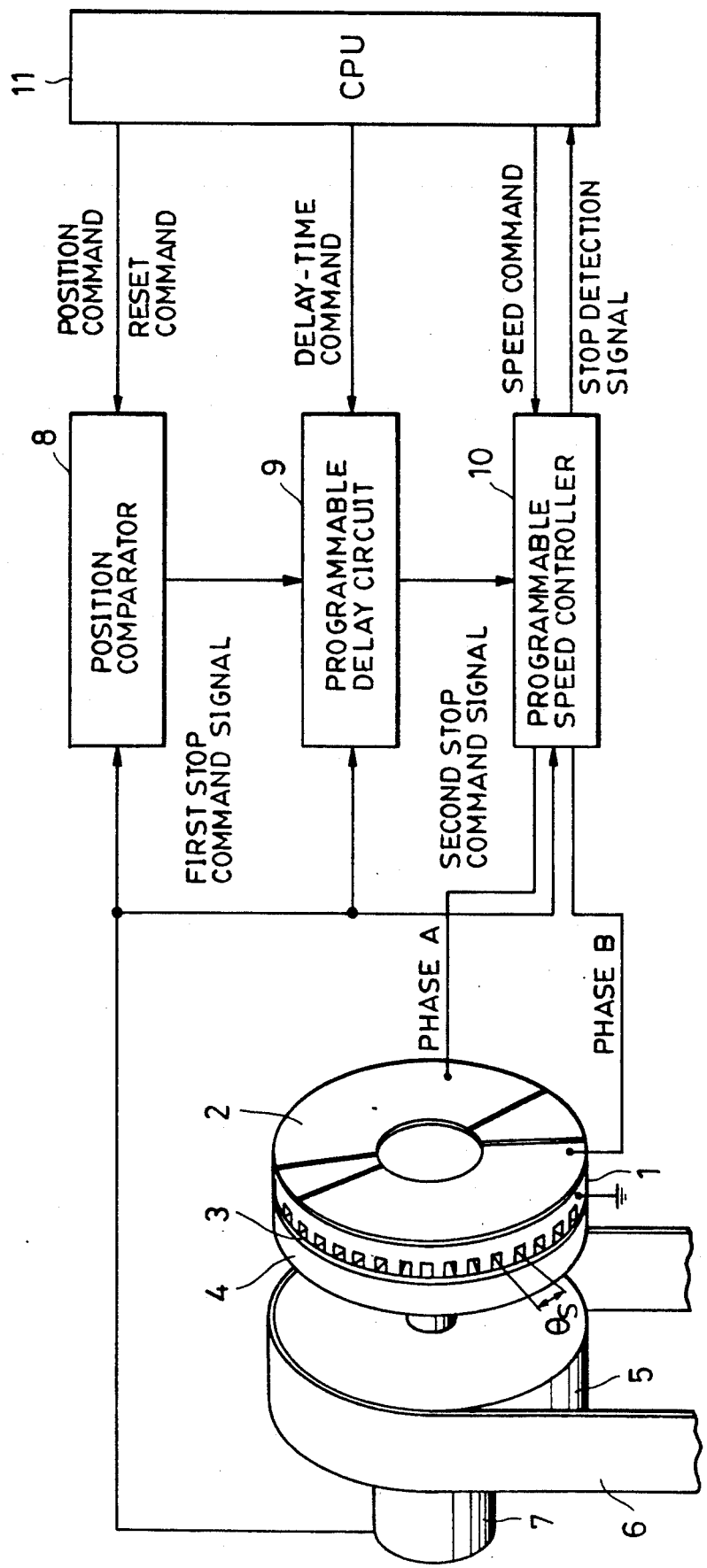
FIG. 1 is a block diagram showing a first embodiment of an actuator device according to the present invention.
Figure 2:
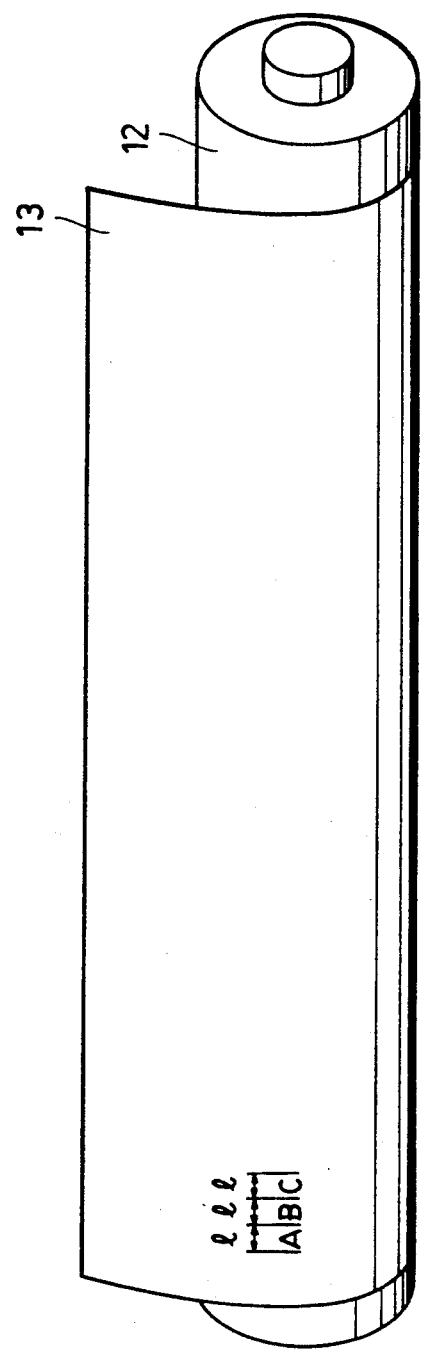
FIG. 2 is a diagram showing a unit distance of movement of a print-head carriage unit driven by the actuator device shown in FIG. 1.
Figure 8:
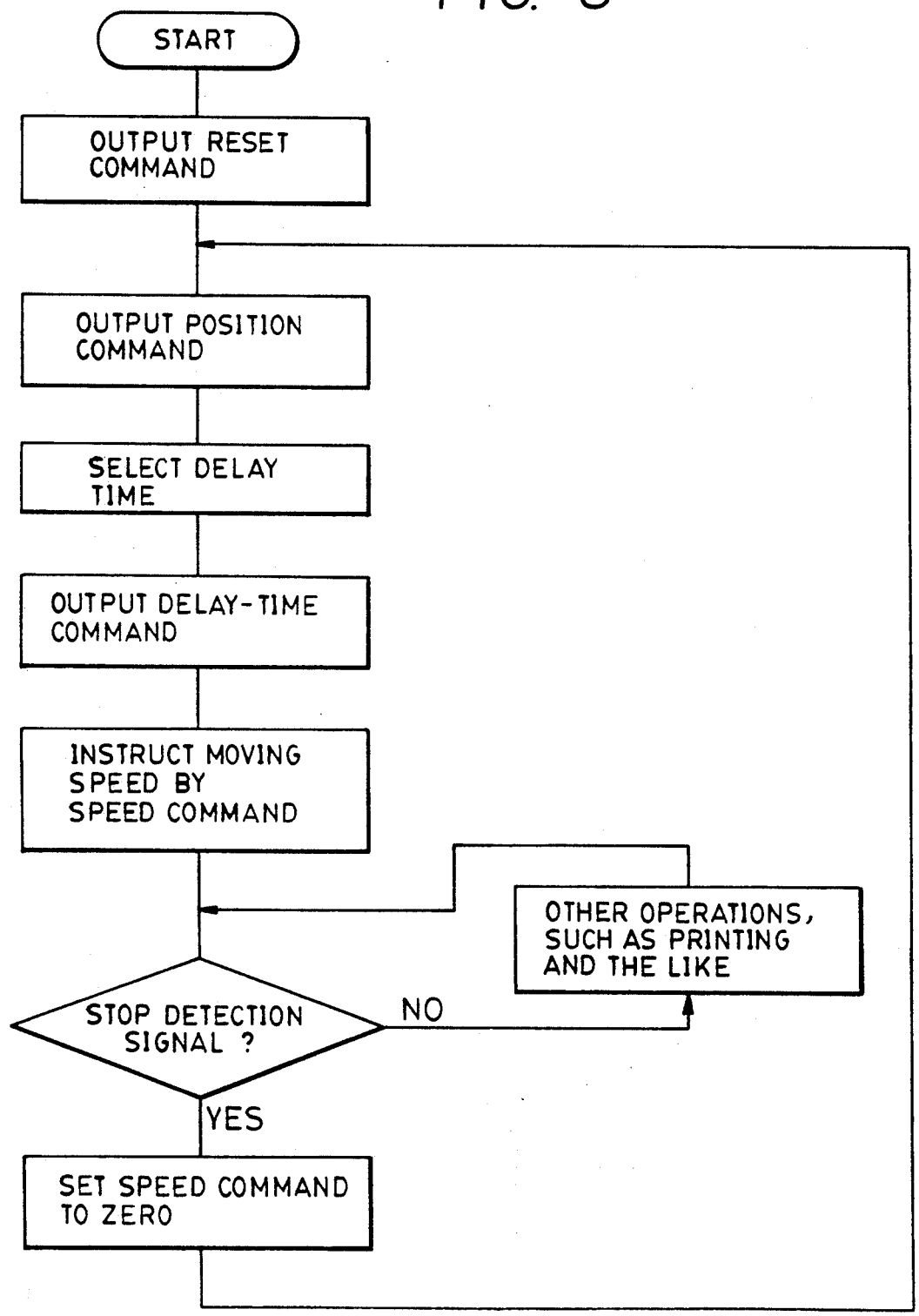
FIG. 8 is a flowchart showing the operation of CPU 11 shown in FIG. 1.

FIG. 1, showing a first embodiment of the present invention, is a block diagram of a control circuit for a print-head carriage of a printer using a rotating-type ultrasonic motor. Each of the elements shown in block outline in FIG. 1, as well as in FIGS. 9(a) and 9(b), is well known per se and its specific type or construction is not critical to carrying out the invention or to a disclosure of the best mode for carrying out the invention. FIG. 8 is a flowchart of the operation of CPU 11 (central processing unit) shown in FIG. 1. In FIG. 1, there is shown a circular elastic member made of an elastic material. An electromechanical energy transducer 2 is composed of a piezoelectric member or the like for generating a traveling vibration wave in the elastic member 1. A friction member 3 adhered or connected to a rotor 4 is made pressure contact with a slit structure of the elastic member 1, and transmits a torque having a direction reverse to the traveling direction of the traveling vibration wave to the rotor 4. A transmission member 5 transmits rotation of the rotor 4 to a belt 6. The belt 6 moves a print head (not shown). A rotary encoder 7 is used for the control of moving speed, stop position and the like of the print head. A position comparator 8 ascertains the position of the print head by counting pulses from the rotary encoder 7 with a counter, compares a position command from the CPU 11 with the position of the print head, and generates a first stop command signal when the position of the print head has passed the position indicated by the position command. The position comparator 8 initializes the counter by a reset command from the CPU 11. The first stop command signal is released when the position command has been changed. A programmable delay circuit 9 delays the first stop command signal in accordance with a delay time command from the CPU 11, and generates a second stop command signal. When the first stop command signal has been input, the programmable delay circuit 9 counts pulses from the rotary encoder 7 by the number of pulses indicated by the delay time command, and then generates the second stop command signal. When the first stop command signal has been released, the programmable delay circuit 9 instantly releases the second stop command signal. A programmable speed controller 10 controls the amplitude, pulse width, frequency, phase difference between phase A and phase B and the like of AC voltage applied to the piezoelectric member 2 so that the frequency of a pulse signal from the encoder 7 corresponds to the speed of the print head so as to move the print head with a speed indicated by a speed command from the CPU 11. The programmable speed controller 10 performs drive and speed control by, for example, a circuit shown in U.S. Pat. No. 4,794,294. If a second stop command signal has been input, the programmable speed controller 10 instantly stops the drive, and outputs the second stop command signal to the CPU as a stop detection signal. Immediately after confirming the stop detection signal, the CPU 11 sets the speed command to zero, and then proceeds to the next operation. In addition to outputting a command to move the print head, print data (not shown) and the like, the CPU 11 changes the delay time command randomly or according to a predetermined rule, or selects one of several predetermined times randomly or according to a predetermined order. FIG. 2 shows an example of actual printing. In FIG. 2, there are shown a roller 12 for paper feed, and recording paper 13. Characters A, B and C are printed on the recording paper 13. Usually, intervals between these characters are nearly constant. Hence, when printing is stopped or reversed at a position where printing of characters has ended, the number of positions to stop or reverse printing is determined by the number of characters in a line. Since characters are arranged with a nearly constant inverval l, if a relation $l = A \cdot R_L \cdot \theta_S$ $(A = 1, 2, 3 \text{---})$ is satisfied, where $\theta_S$ is a central angle for one slit on the elastic member 1 and $R_L$ is a conversion coefficient for converting the rotation of the transmission memer 5 into a linear movement, marks of the slits are produced on the friction member 3 because relative positional relation between the slits and the friction member 3 at positions to stop or reverse printing is always the same. As a result, variations in speed increase. In the present embodiment, by delaying the first stop command signal and dispersing the delay time within an appropriate time range (an amount of one slit or N slits, time range for moving by l, or the like), marks of the slits are not produced.

FIGS. 9(a) and 9(b) are circuit diagrams showing examples of the position comparator 8 and the programmable delay circuit 9 shown in FIG. 1.

The operation of the present embodiment will now be explained according to the flowchart shown in FIG. 8.

When the process has started, the CPU 11 transmits a reset command to the counter and memory in the comparator 8 (FIG. 9(a)), and resets the contents.

Subsequently, the CPU 11 transmits stop-position data (an interger multiple of l) to the memory as a position command. This command functions equivalent to a reset command, and the memory and counter are reset by this command. The CPU 11 then inputs a delay-time command to the memory in the delay circuit 9 (FIG. 9(b)). As for data of the delay-time command, different data are randomly input every time the command is performed in accordance with the table shown in FIG. 10.

Subsequently, the CPU 11 inputs a speed command to the speed controller 10, and also transmits a driving signal to phase A and phase B of the energy transducer 2 shown in FIG. 1 in addition to drive a motor. The rotor 4 thereby starts to rotate. Subsequently, a printing operation and the like are performed. Pulses from the encoder 7 are input to the counter in the comparator 8. When the count value by the counter corresponds to position data input to the memory in the comparator 8, a first stop command signal is output from the comparator in the comparator 8, which signal is transmitted to the counter in the delay circuit 9 (FIG. 9(b)) to release reset of the counter. Accordingly, the counter in the delay circuit 9 starts to count pulses from the encoder 7 from this time. When the count value by the counter coincides with delay-time data input to the memory in the delay circuit 9 (FIG. 9(b)), a second stop command signal is output from the comparator and is transmitted to the speed controller 10. In response to the second stop command signal, the speed controller 10 interrupts the driving signal input to the energy transducer 2 to stop the motor. The second stop command signal is also input to the CPU 11 as a stop detection signal, and the CPU 11 sets the speed command to zero. Subsequently, the CPU 11 outputs again a position command, and the above-described operation is then repeated.

In the above-described operation, after interrupting the driving signal and stopping the motor, a reverse command may be output to the motor to return the print head to an initial position, the motor may be stopped again, and the speed command may then be set to zero.

In the above-described operation, since delay-time data are set to a different random value at every stop, as shown in FIG. 10, the stop positions of the slits relative to the rotor 4 are different at every time. Hence, it is possible to solve the problem of the slit marks.

When it is possible to shift the stop positions or reverse positions, the influence by the slit marks can be reduced by selecting the values $R_L$ (coefficient of rotation line conversion) and $\theta_s$ (a cetral angle for one slit) so that the relation $l = A \cdot R_L \cdot \theta_s$ ($A = 1, 2, 3\text{- - -}$) is not satisfied.

Figure 3:
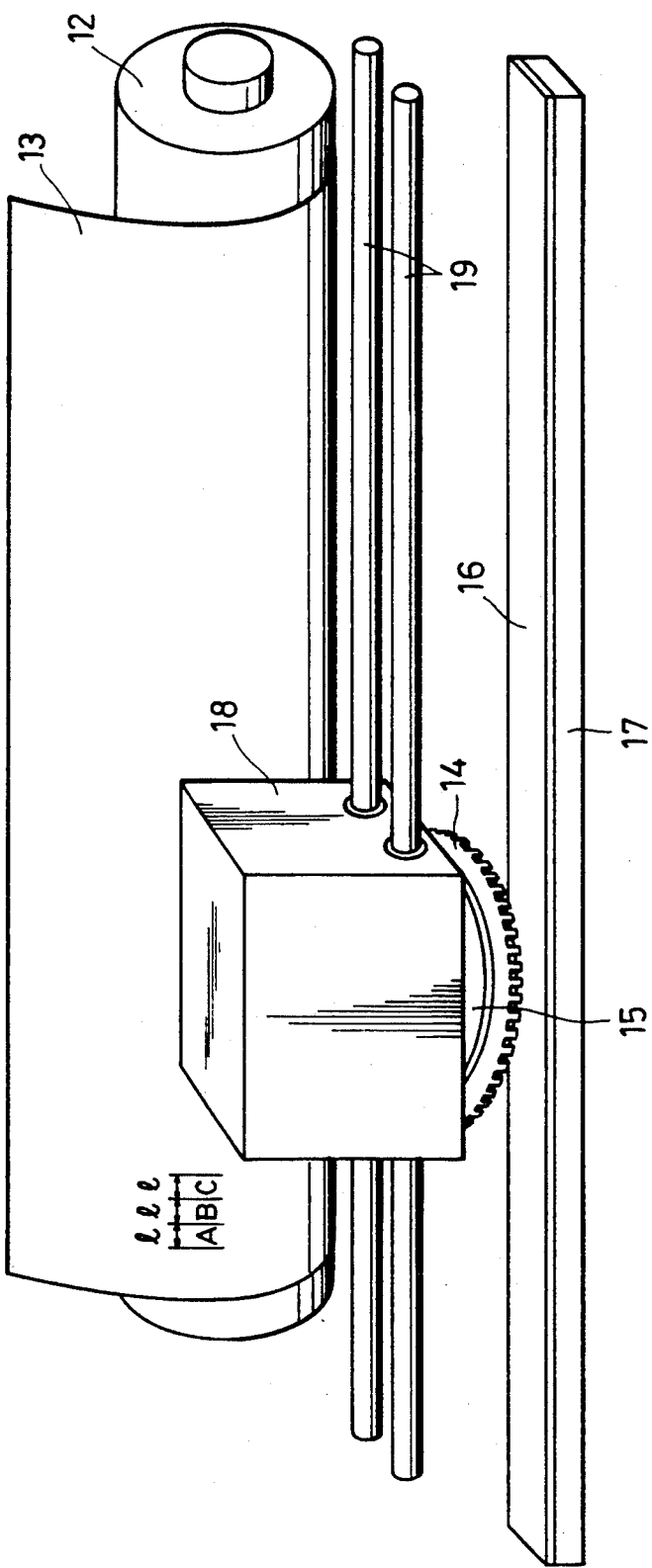
FIG. 3 is a diagram showing the configuration of another embodiment of the present invention.
Figure 4A:
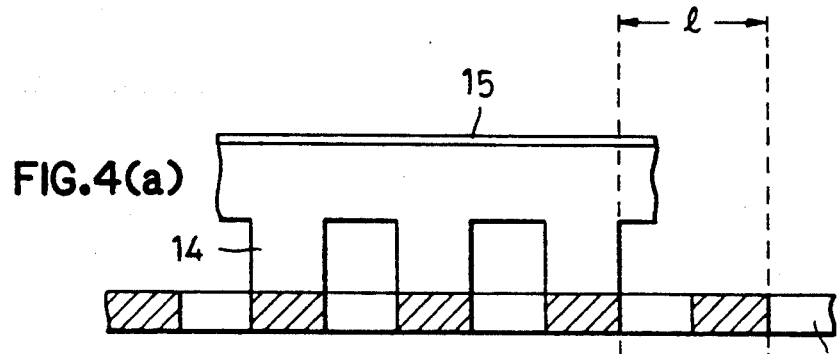
FIGS. 4(a)-4(e) are diagrams showing positional relationship between projections on an elastic member and a friction member shown in FIG. 3.
Figure 4B:
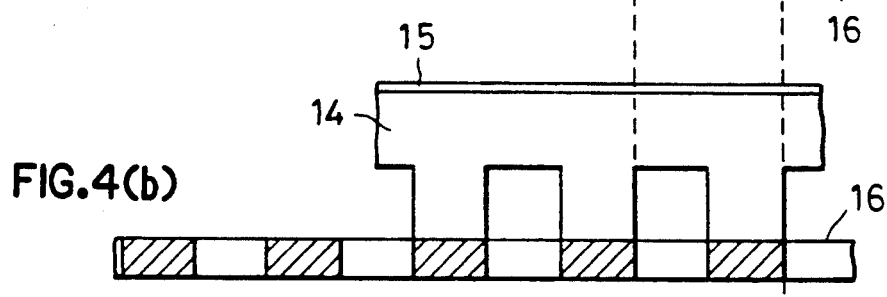
Figure 4C:
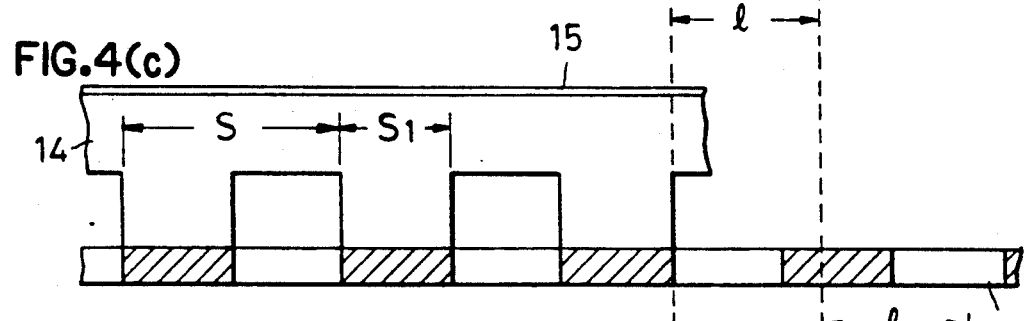
Figure 4D:
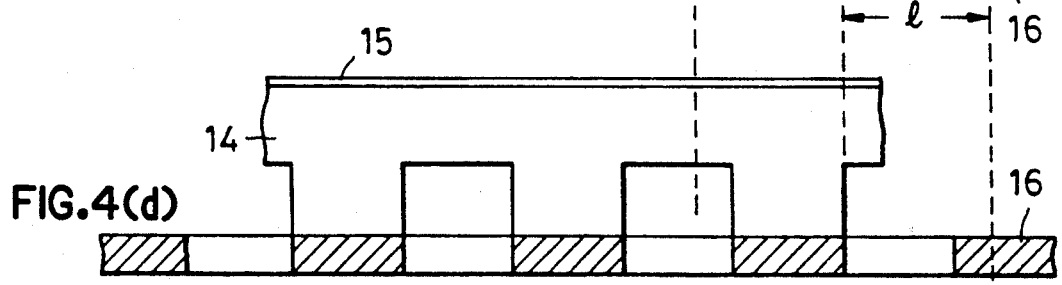
Figure 4E:
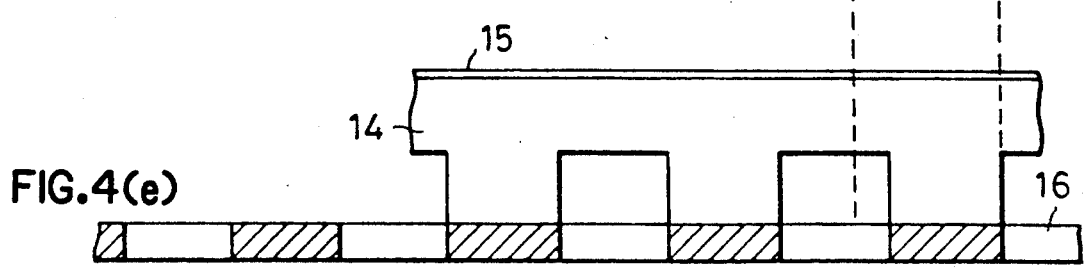

FIG. 3, showing a second embodiment, is a diagram of the configuration of a carriage of a print head for a printer using a linear-type ultrasonic motor. In FIG. 3, an elliptic elastic member 14 has a slit structure. A piezoelectric member 15 is adhered to a surface opposite to the surface having projections and slits. A slit-structure portion in a linear portion of the elastic member 14 is in contact with a friction member 16 adhered on a base 17 with an appropriate pressing force. By generating a traveling vibration wave in the elastic member 14, a print-head unit 18 is subjected to linear reciprocating movement along shaft bars 19.

FIG. 4 shows diagrams representing positional relationships between a part of the slit-structure portion of the elastic member 14 and the friction member 16 when the slit structure portion is moved by a unit distance of movement l. Hatched portions represent positions where slit marks are produced. FIGS. 4(a) and 4(b) represent a case in which the interval between slits in the elastic member 14 is l. FIGS. 4(c), 4(d) and 4(e) represents a case in which the interval is 1.5 l. As is apparent from FIG. 4, when it is necessary to stop the print-head unit at every amount of movement l or every integer multiple of l, if the interval between slits is l, the slit marks are produced at identical positions. Hence, minute projections and recesses are produced on the surface of the friction member 16, and the elastic member 14 slips thereon or collides therewith, causing deterioration in the peformance of the device. If the interval between slits is set to 1.5 l, since positions of the slit marks are shifted even if the print-head unit is stopped at every amount of movement l. Hence, the surface of the friction member 16 is worn in a relatively uniform manner, and it is therefore possible to keep the performance of the device stable for a long period. The values of S and $S_1$ may be set so that the number of start and stop operations until the relative positional relationships between the projections on the elastic member 14 and the friction member 16 nearly coincide with each other when a start and stop operation having the unit distance of movement l is repeated becomes at least $S/S_1$, where S is the interval between the projections and $S_1$ is the width of the projection. Although, in the present embodiment, a case has been illustrated in which the interval between the slits is longer than distance l, the interval may be smaller than the distance l, such as l/1.5 or the like. The above-described drive for every l or an integer multiple of l may be realized by setting the position command data shown in FIG. 1 to the value l or an integer multiple of l and instantly stopping the motor by the first stop command signal.

In the above-described linear-type ultrasonic actuator, since a highly accurate performance for wow/flutter is demanded within a print range in a use as shown in FIG. 3, the device may be configured so that the start/stop operation or the forward/reverse rotation is peformed only at two ends of a movable range.

Figure 5:
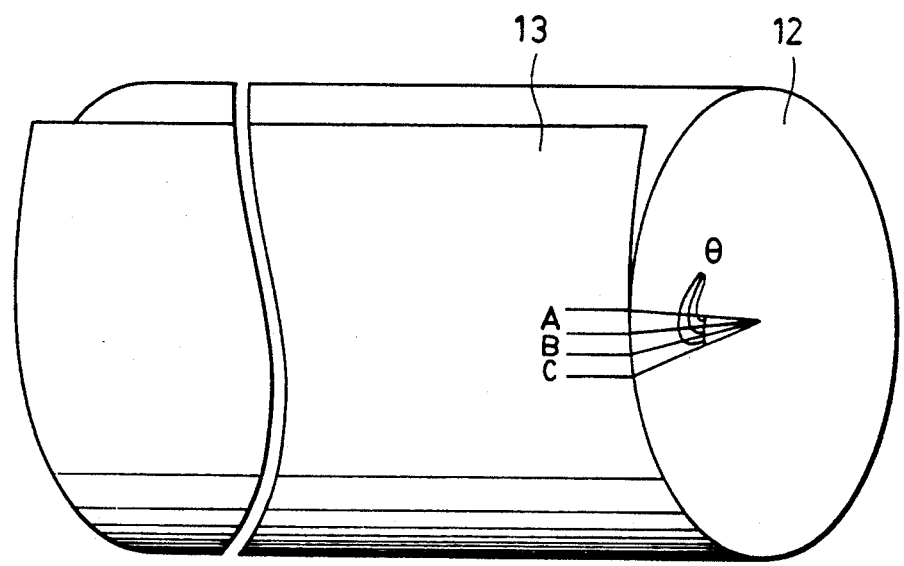
FIG. 5 is a diagram showing the configuration of still another embodiment.

Although a linear movement has been illustrated in the above-described second embodiment, the similar effects may be obtained by performing the same kind of control for uses wherein movement or rotation having an integer multiple of a unit amount of movement and a unit rotation angle 0 is repeated, such as a paper-feed mechanism as shown in FIG. 5, a stage for a stepper (an exposure apparatus for semiconductor devices), or the like.

Figure 6A:
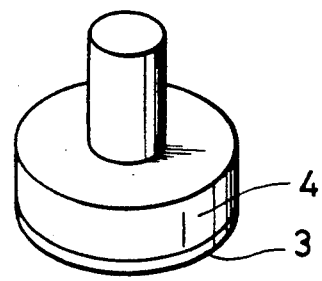
FIGS. 6(a), 6(b) and 6(c) are diagrams showing the configuration of still other embodiments.

Although, in the foregoing embodiments, an explanation has been provided of ultrasonic actuators utilizing traveling waves, the present invention may also be applied to an ultrasonic actuator utilizing a standing wave. FIG. 6 illustrates an ultrasonic actuator utilizing a standing wave. FIG. 6(a) shows a rotor unit, and FIGS. 6(b) and 6(c) show different vibrators.

Figure 6B:
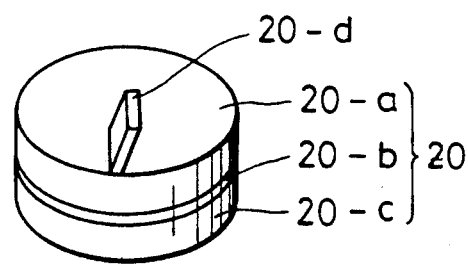
Figure 6C:
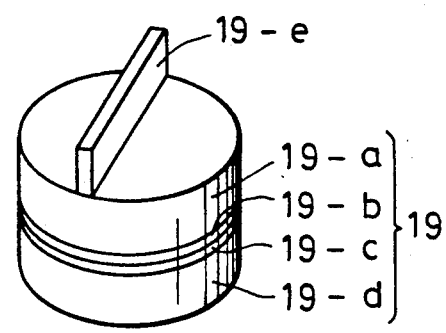
Figure 7A:
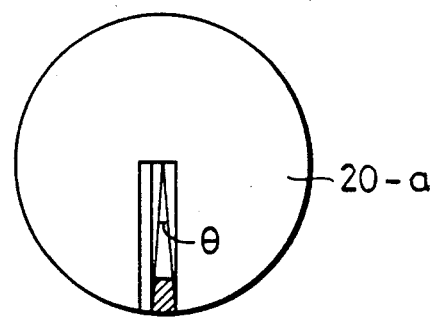
FIGS. 7(a) and (7b) are plan views of the FIG. 6 embodiments.
Figure 7B:
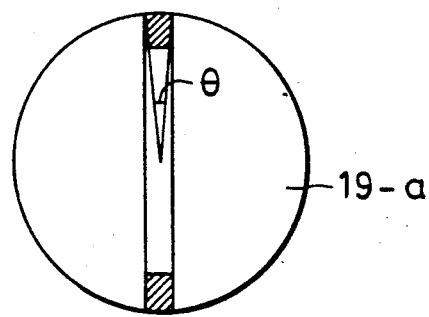

A vibrator 20 shown in FIG. 6(b) comprises a piezoelectric member 20-b, made of laminated PZT or the like, sandwiched between elastic members 20-a and 20-c. When the vibrator 20 is vibrated in the direction of its thickness, since an upper projection 20-d is obliquely disposed, the direction of vibration of the distal end of the projection 20-d is converted into the direction of rotation. A vibrator 19 shown in FIG. 6(c) comprises two piezoelectric members 19-b and 19-c, made of laminated PZT or the like, sandwiched between elastic members 19-a and 19-d. The surface of an upper protruded member 19-e performs an elliptical movement as a result of synthesis of vibrations in the direction of torsion and in the direction of the thickness. A rotor is put into pressure contact with the upper projection 19-e or 20-d on the vibrators 19 or 20 to provide a rotating-type motor. FIG. 7 shows plan views of the projection 19-e and 20-d on the vibrators 19 and 20, respectively. Relative positional relationships between each of the projections on the vibrators and the frictional member 3 coincide with each other at every rotation of the rotor in the case of the vibrator 20 and every half rotation of the rotor in the case of the vibrator 19. Hence, each of the projections 19-e and 20-d on the vibrators 19 and 20 uniformly contacts the friction member 3. If the number of start and stop operations until the subsequent relative positional relation becomes a nearly identical positional relationship when a start and stop operation having a constant rotation angle is repeated is set to at least $360/\theta$ ($\theta$: a rotation angle for the projection) times when the vibrator 20 is used, and to at least $180/\theta$ times when the vibrator 19 is used. That is, if it is assumed that an interval between the projections is constant when the vibrator is stopped at every predetermined rotation angle, uniform contact becomes possible by setting the projections so that the number of start and stop operations until a nearly identical positional relation is subsequently obtained becomes at least $360/(N \cdot \theta)$ times, where N is the number of the projections and $\theta$ is a central angle for the projections.

Although, in the above-described embodiments, an explanation has been provided of a case in which the interval between the projections is constant, it is also possible to arrange the vibrator so that slit marks are not produced by using, for example, a method in which the interval between the projections is sinusoidally changed.

What is claimed is:

1. An actuator device for regulating a contact member in contact with a projection formed in a vibrator and for producing relative movement between the vibrator and the contact member by vibrating the vibrator, said actuator comprising:
   a driving circuit for generating vibrations in the vibrator; and
   control means for controlling the vibrator so that a stop position between the projection and the contact member randomly changes at every stop operation of the vibrator by said driving circuit.

2. An actuator device according to claim 1, wherein the vibrations generated in the vibrator by said drive circuit produce movement between the projection and the contact member, and the projection is maintained is contact with the contact member by a friction member.

3. An actuator device according to claim 2, wherein said drive circuit generates vibrations in a vibrator having a plurality of projections.

4. An actuator device for regulating a contact member in contact at contact positions with a plurality of projections formed in a vibrator through a friction member and for producing relative movement between the vibrator and the contact member by vibrating the vibrator, said actuator device comprising:
   a driving circuit for generating vibrations in the vibrator; and
   a control circuit for controlling a time to stop the vibrations so that the contact positions between the projections and the friction member at every stop operation of said driving circuit are not identical to one another.

5. An actuator device according to claim 4, wherein said control circuit includes a first circuit for outputting a first signal when a first predetermined amount of relative movement between the vibrator and the contact member has taken place, and a second circuit for outputting a second signal when a second predetermined amount of relative movement between the vibrator and the contact member has taken place after said first signal is output, wherein the operation to generate vibrations by said driving circuit is stopped by said second signal, and wherein said control circuit further includes a third circuit for randomly changing or shifting by a third predetermined amount the second predetermined amount of relative movement from the output of the first signal to the output of the second signal by said second circuit.

6. An actuator device according to claim 5, wherein said third circuit changes the amount of the third predetermined movement within a range of an interval between each projection and an integer multiple of the intervals between the projections.

7. An actuator device for regulating relative movement between a contact member and a vibrator having a plurality of projections at predetermined intervals, with a friction member placing the contact member in contact with the projections, said actuator comprising:
   a driving circuit for generating vibrations in the vibrator to produce the relative movement between the vibrator and the contact member; and
   control means for setting an amount of relative movement between the vibrator and the contact member to an integer multiple of a unit amount of relative movement, for stopping and starting vibrations by said driving circuit at every amount of relative movement, and for setting either one of an interval between the projections and the unit amount of relative movement so that the unit amount is not an integer multiple of the interval between the projections.

8. An actuator device for regulating relative circular movement between a contact member and a vibrator having a plurality of projections at predetermined intervals, with a friction member placing the contact member in contact with the projections, said actuator comprising:
   a driving circuit for generating vibrations in the vibrator to produce the relative circular movement between the vibrator and the contact member; and
   control means for setting an amount of relative circular movement between the vibrator and the contact member to an integer multiple of a unit angle of rotation, for stopping and starting vibrations by said driving circuit at every amount of relative circular movement, and for setting either one of the unit interval between the projections and an angle of rotation so that the unit angle of rotation is not an integer multiple of a central angle for a circular arc having a length of the interval between the projections.

9. An actuator device for regulating relative circular movement between a contact member and a vibrator having N projections, with N being an integer, with a friction member placing the contact member in contact with the projections, said actuator comprising:
   a drive circuit for generating vibrations in the vibrator to produce the relative circular movement between the vibrator and the contact member; and
   control means for controlling relative circular movement amount at an integer multiple of a unit angle of rotation, and for setting the number of said relative circular movements at which the projections and the contact member become identical in position, as the unit angle of rotation is set to at least $360/(N\cdot\theta)$, where $\theta$ is a central angle of the projections.

* * * * *

UNITED STATES PATENT AND TRADEMARK OFFICE
CERTIFICATE OF CORRECTION

PATENT NO. : 5,155,418
DATED : October 13, 1992
INVENTOR(S) : Kenichi Kataoka

It is certified that error appears in the above-identified patent and that said Letters Patent is hereby corrected as shown below:

COLUMN 3:

Line 59, "CPU" should read --CPU 11--.

COLUMN 5:

Line 36, "represents" should read --represent--.

COLUMN 7:

Line 15, "is" (second occurrence) should read --in--.

COLUMN 8:

Line 50, "movements" should read --movement--.

Signed and Sealed this

Thirtieth Day of November, 1993

Attest:

BRUCE LEHMAN

Attesting Officer

Commissioner of Patents and Trademarks